(12) United States Patent
Buddhikot et al.

(10) Patent No.: US 8,532,045 B2
(45) Date of Patent: Sep. 10, 2013

(54) METHOD AND SYSTEM FOR SPECTRUM MANAGEMENT

(75) Inventors: Milind M. Buddhikot, Bridgewater, NJ (US); Mahmoud Al-Ayyoub, Coram, NY (US); Himanshu Gupta, Kings Park, NY (US)

(73) Assignee: Alcatel Lucent, Paris (FR)

( * ) Notice: Subject to any disclaimer, the term of this patent is extended or adjusted under 35 U.S.C. 154(b) by 199 days.

(21) Appl. No.: 13/080,216

(22) Filed: Apr. 5, 2011

(65) Prior Publication Data

US 2011/0243084 A1    Oct. 6, 2011

Related U.S. Application Data

(60) Provisional application No. 61/320,981, filed on Apr. 5, 2010.

(51) Int. Cl.
*H04W 4/00* (2009.01)
*H04W 72/00* (2009.01)
*H04J 3/16* (2006.01)

(52) U.S. Cl.
USPC ......... 370/329; 370/252; 370/468; 455/452.2

(58) Field of Classification Search
USPC ................. 370/252, 328–330, 340, 341, 400, 370/401, 431, 468; 455/450–453
See application file for complete search history.

(56) References Cited

U.S. PATENT DOCUMENTS

| 6,038,455 | A  | * | 3/2000  | Gardner et al. ............... 455/450 |
| 6,188,903 | B1 | * | 2/2001  | Gardner et al. ............... 455/450 |
| 2008/0268833 | A1 | * | 10/2008 | Huang et al. .................. 455/425 |
| 2010/0009710 | A1 | * | 1/2010  | Zhang et al. .................. 455/522 |
| 2010/0177722 | A1 | * | 7/2010  | Guvenc ........................ 370/329 |
| 2010/0272218 | A1 | * | 10/2010 | Yeh et al. ...................... 375/330 |

* cited by examiner

*Primary Examiner* — Kerri Rose
(74) *Attorney, Agent, or Firm* — Wall & Tong, LLP

(57) ABSTRACT

A method and apparatus for defining spectral usage at a base station in a wireless network. In various embodiments, the wireless network is divided into a plurality of regions, such that each of the regions may have associated with it one or more interfering adjacent regions, which are associated with different portions of a spectral allocation.

22 Claims, 7 Drawing Sheets

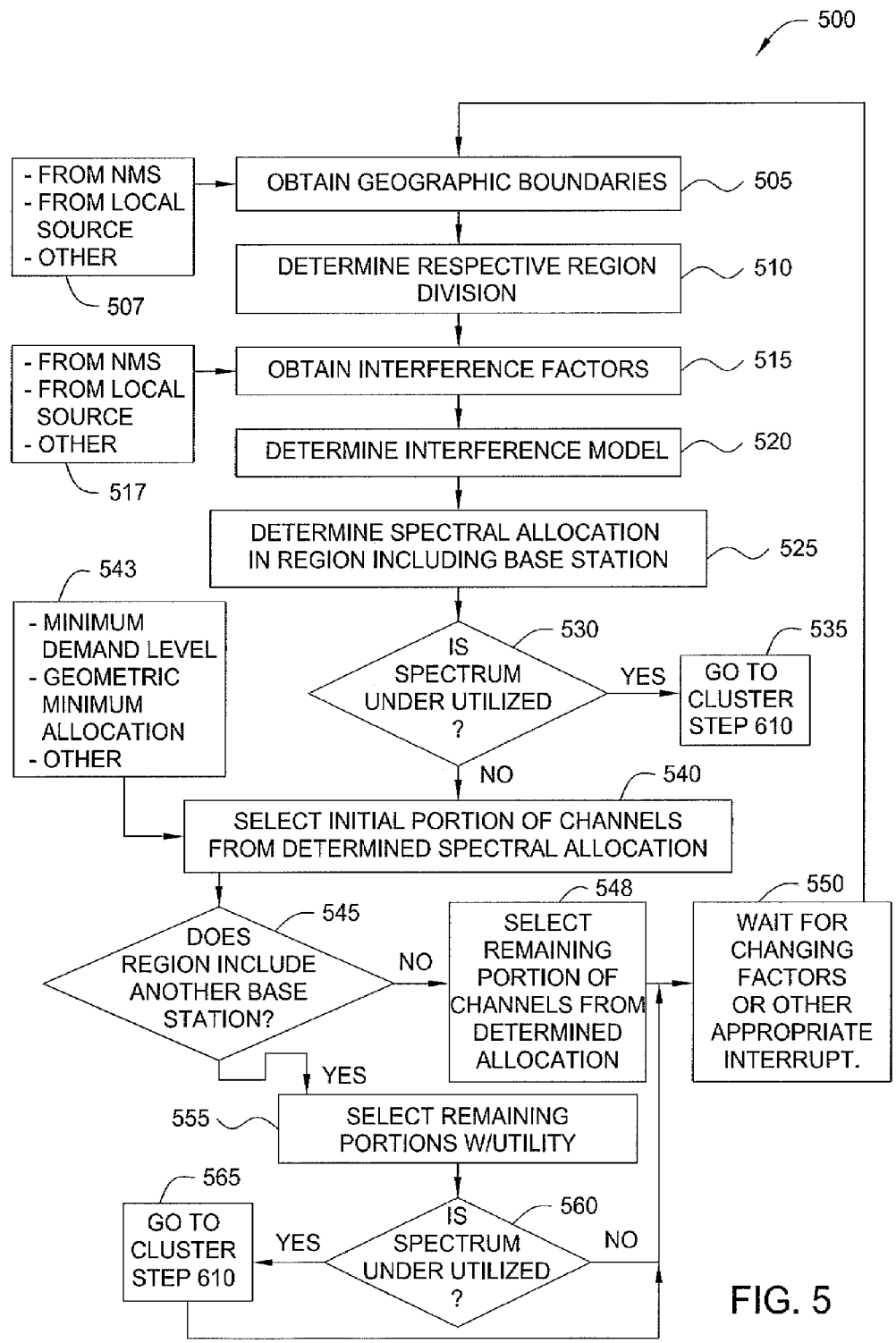

METHOD AND SYSTEM FOR SPECTRUM MANAGEMENT

CROSS REFERENCE TO RELATED APPLICATIONS

This application claims the benefit of U.S. Provisional patent application Ser. No. 61/320,981, filed Apr. 5, 2010, which is herein incorporated by reference in its entirety.

GOVERNMENT RIGHTS

This invention was made with U.S. Government support under U.S. National Science Foundation CISE Contract No. CNS-0831762. The U.S. Government has certain rights in this invention.

FIELD OF THE INVENTION

The invention relates generally to the field of communication network management and, more specifically, to self-configuration of fractional frequency reuse patterns in 4G LTE networks.

BACKGROUND

Service providers are always looking to manage their Capital Expense (CAPEX) to deploy the network and Operating Expense (OPEX) for configuring, monitoring and managing deployed networks. For example, in macro-cellular wireless networks, the cost of configuring and tuning the performance of the network involves time and man-power intensive operations such as configuration of parameters such as spectrum reuse patterns, power levels, antenna tilts and drive-runs to estimate real cell coverage.

SUMMARY

Various deficiencies of the prior art are addressed by a method and apparatus for defining spectral usage at one or more base stations in a wireless network.

One embodiment comprises a method for defining spectral usage at a base station in a wireless network, the wireless network being divided into a plurality of regions, wherein each of the regions may have associated with it one or more interfering adjacent regions, wherein interfering adjacent regions are associated with different portions of a spectral allocation, the method comprising: determining, at the base station, the spectral allocation associated with the region including the base station; and selecting for use an initial portion of a plurality of channels within the determined spectral allocation sufficient to meet a minimum demand level.

In various embodiments the steps of determining and selecting are performed after the base station is provisioned with the necessary information from the network management system.

BRIEF DESCRIPTION OF THE DRAWINGS

The teachings of the present invention can be readily understood by considering the following detailed description in conjunction with the accompanying drawings, in which:

FIG. 5 depicts one embodiment of a method for performing a spectral allocation function.

To facilitate understanding, identical reference numerals have been used, where possible, to designate identical elements that are common to the Figures.

DETAILED DESCRIPTION

The invention will be primarily described within the context of particular embodiments; however, those skilled in the art and informed by the teachings herein will realize that the invention is also applicable to other technical areas and/or embodiments.

Generally speaking, the various embodiments enable, support and/or provide a configuration paradigm enabling one or more base stations to self-configure in defining spectral usage, including fractional frequency reuse patterns in 4G LTE networks.

The cellular network technologies that allow an operator to fully use all its licensed spectrum in every base station (i.e., frequency reuse of 1) are very attractive. However, such co-channel frequency reuse among neighbor base stations increases interference in overlapping cell-edge areas and as a result performance is degraded. One way to solve this problem is to configure the base stations to use different ("fractional") parts of the spectrum to serve edge users. Such Fractional Frequency Reuse (FFR) and associated inter-cell interference coordination (ICIC) have been considered in emerging LTE (Long Term Evolution) networks. However, manually configuring the FFR patterns especially in the event of cell additions and deletions does not scale and can be cost-intensive. In recent years, Self-management (Self-X) technologies that fully automate the tasks of managing (i.e., configuring, monitoring and optimizing) a cellular network are emerging as an important tool in reducing service provider OPEX and CAPEX and will be a distinguishing feature of LTE networks.

Various embodiments operate to provide a flexible tool that can be tuned to achieve some of these objectives (fully of partially) without sacrificing the others. For each possible choice of parameter values made by the network designer, the various methodologies, functions, programs, topologies, tools and so on described herein deliver a relatively optimal spectrum utilization with specific bandwidth guarantees.

Figure 1:
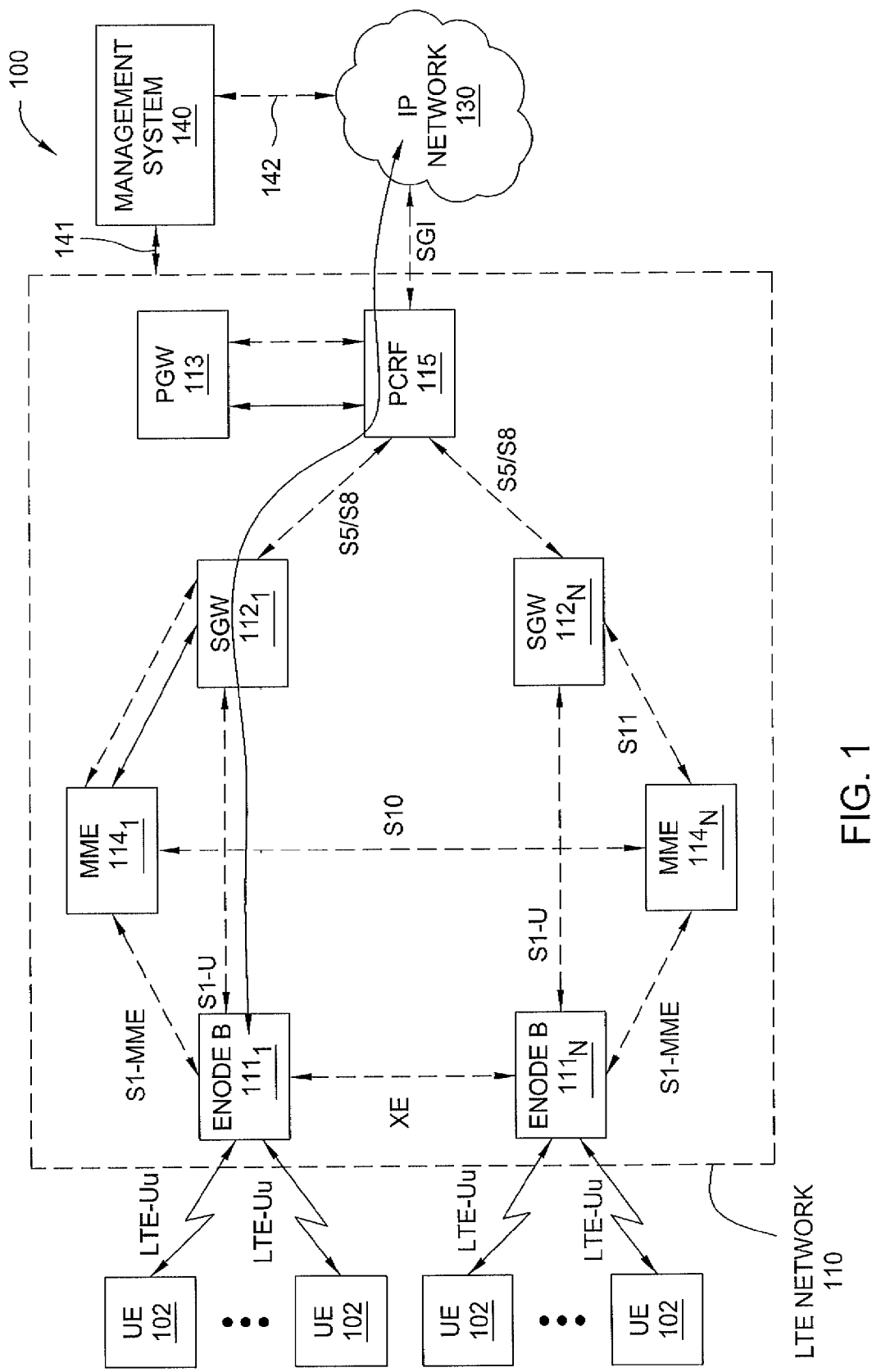
FIG. 1 depicts an exemplary wireless communication system including a management system according to an embodiment.

FIG. 1 depicts an exemplary wireless communication system including a management system according to an embodiment. Specifically, FIG. 1 depicts an exemplary wireless communication system 100 that includes a plurality of User Equipments (UEs) or User Devices (UDs) 102, a Long Term Evolution (LTE) network 110, IP network 130, and a management system (MS) 140. The LTE network 110 supports communications between the UEs 102 and IP network 130. The MS 140 is configured for supporting self-configuration functions for a base station such as described herein.

The LTE network 110 is an exemplary network only; other types of networks may be used within the context of the various embodiments. The basic configuration and operation of LTE networks will be understood by one skilled in the art. The exemplary LTE network 110 includes a plurality of eNodeBs $111_1$ through $111_N$ (collectively, eNodeBs 111), a plurality of Serving Gateways (SGWs) $112_1$ and $112_N$ (collectively, SGWs 112), a Packet Data Network (PDN) Gateway (PGW) 113, a plurality of Mobility Management Entities (MMEs) $114_1$ through $114_N$ (collectively, MMEs 114), and a Policy and Charging Rules Function (PCRF) 115. The eNodeBs 111 provide a radio access interface for UEs 102. The SGWs 112, PGW 113 and MMEs 114, as well as various components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102.

The MMEs 114 provide mobility management functions in support of mobility of UEs 102. The MMEs 114 support the eNodeBs 111. The MME $114_1$ supports eNodeB $111_1$ and the MME $114_2$ supports eNodeB $111_2$. The communication between MMEs 114 and eNodeBs 111 is supported using respective S1-MME interfaces, which provide control plane protocols for communication between the MMEs 114 and the eNodeBs 111.

The SGWs 112 support communications for eNodeBs 111. As depicted in FIG. 1, SGW $112_1$ supports communications for eNodeB $111_1$ and SGW $112_N$ supports communications for eNodeB $111_N$. The communication between the SGWs 112 and the eNodeBs 111 is supported using respective S1-u interfaces. The S1-u interfaces support per-bearer user plane tunneling and inter-eNodeB path switching during handover.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which are Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and IP network 130 via an SGi interface.

The IP network 130 include one or more packet data networks via which UEs 102 may access content, services, and the like from various network elements connected thereto.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP network 130. In one embodiment, for example, MS 140 may communicate with LTE network 110 via a communication path 142 which is supported by IP network 130. The communication paths 141 and 142 may be implemented using any suitable communications capabilities. An exemplary management system suitable for use as MS 140 of FIG. 1 is depicted and described with respect to FIG. 2.

Figure 2:
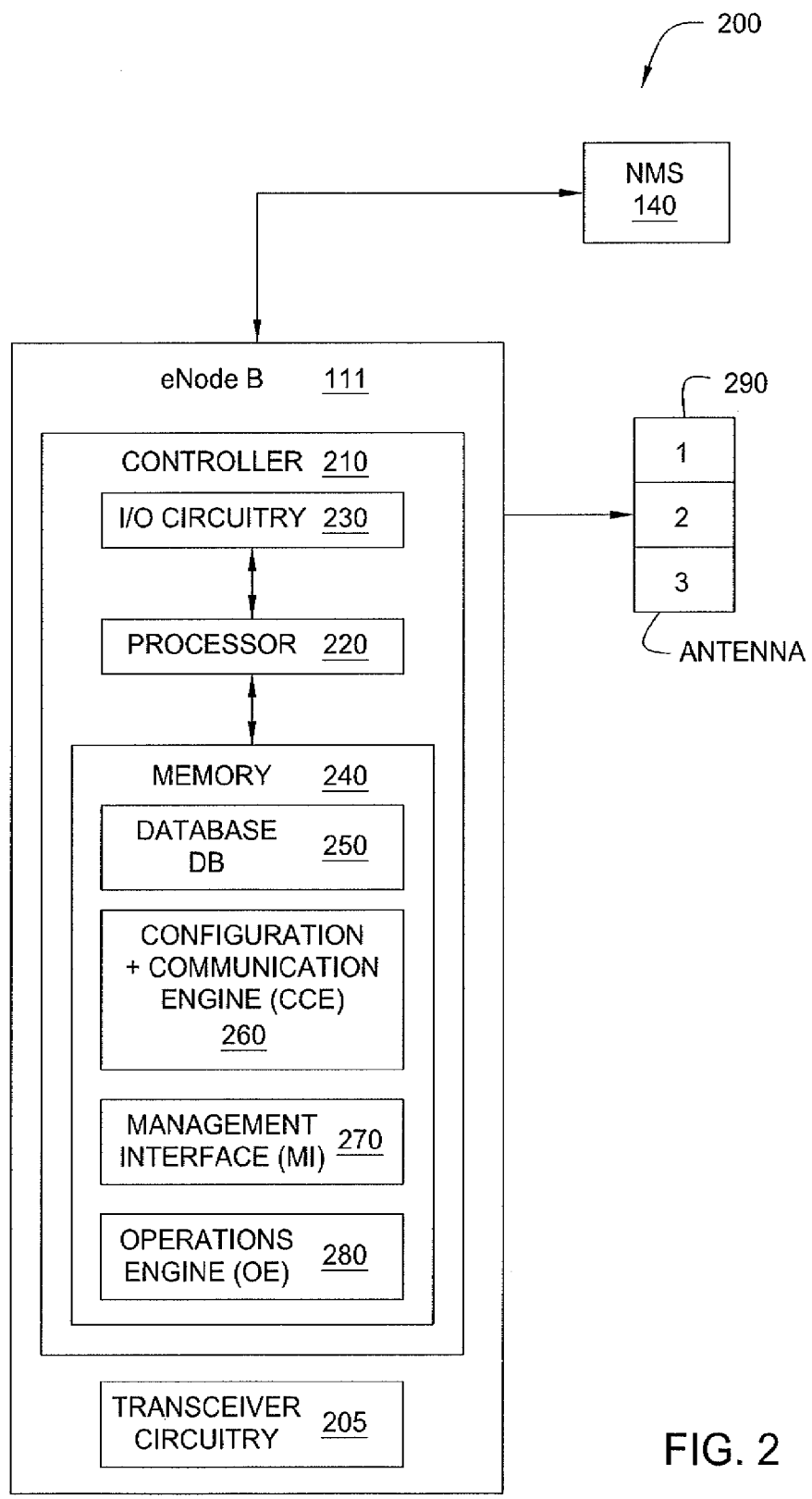
FIG. 2 depicts an eNodeB system suitable for use in the wireless communication network of FIG. 1.

FIG. 2 depicts an exemplary eNodeB system suitable for use in the network system of FIG. 1. As depicted in FIG. 2, eNodeB 111 includes a controller 210 which includes a processor 220, I/O Circuitry 230 and a memory 240. The eNodeB 111 also includes transceiver circuitry that cooperates with controller 110 and is operative to communicate with various UEs 102 via antenna 290.

Processor 220 is adapted to cooperate with memory 240, I/O circuitry 230, and antenna 290 to provide various wireless functions for the base station.

I/O circuitry 230 is adapted to facilitate communications with peripheral devices both internal and external to processor 220. For example, I/O circuitry 230 is adapted to interface with transceiver circuitry 205. Similarly, I/O circuitry 230 is adapted to facilitate communications with one or more user workstations (not shown), management interface 270, operations engine 280 and the like. In various embodiments, a connection is provided between processor ports and any peripheral devices used to program or otherwise manage eNodeB functions.

Although primarily depicted and described with respect to antenna 290, it will be appreciated that I/O circuitry 230 may be adapted to support communications with any other devices suitable for providing the wireless services associated with the base station.

Memory 240, generally speaking, stores data and software programs that are adapted for use in providing various eNodeB functions within the LTE network 110. The memory includes a Data Base (DB) 250, a Configuration and Communications Engine (CCE) 260, a Management Interface (MI) 270, and an Operations Engine (OE) 280.

In one embodiment, DB 250, CCE 260, MI 270 and OE 280 are implemented using software instructions which may be executed by processor (e.g., controller 210) for performing the various functionalities depicted and described herein. DB 250 stores data which may be generated by and used by one or more of the programs of memory 240. DB 250 may be implemented as a single database or multiple databases in any of the arrangements known to those skilled in the art.

Although depicted and described with respect to an embodiment in which each of the engines, databases, and tools is stored within memory 240, it will be appreciated by those skilled in the art that the engines, database, and/or tools may be stored in one or more other storage devices internal to MS 240 and/or external to MS 240. The engines, databases, and/or tools may be distributed across any suitable numbers and/or types of storage devices internal and/or external to MS 240. The memory 240, including each of the engines, database, and tools of memory 240, is described in additional detail herein below.

As described herein, memory 240 includes DB 250, CCE 260, MI 270 and OE 280, which cooperate to provide the various spectral allocation functions depicted and described herein. Although primarily depicted and described herein with respect to specific functions being performed by and/or using specific ones of the engines, database, and/or tools of memory 240, it will be appreciated that any of the spectral allocation functions depicted and described herein may be performed by and/or using any one or more of the engines, database, and/or tools of memory 240.

The engines and tools may be activated in any suitable manner. In one embodiment, for example, the engines and tools may be activated in response to manual requests initiated by network operators, in response to automated requests initiated by MS 140, or other base stations and the like, as well as various combinations thereof.

For example, where an engine or tool is activated automatically, the engine or tool may be activated in response to scheduled requests, in response to requests initiated by MS 140 based on processing performed at MS 140. A description of the engines, database, and tools of memory 240 follows.

As previously noted, various embodiments of an LTE network 110 include an eNodeBs 111 in communication with an infrastructure including UE 102, SGWs 112, PGW 113, MMEs 114 and network management system 140.

The infrastructure is architected to provide the appropriate and necessary wireless services offered by the network service provider. The network service provider manages the network to provide its service offerings to its wireless/mobile users in a manner consistent with the consumer expectations. For example, wireless/mobile users (e.g., users of standard telephones, smart phones, computers and the like purchasing various voice, data or other service offerings) expect near perfect telephone/voice service, very near perfect data services, glitch-free streaming media and the like. Third party service providers purchasing service bundles for their own users expect the same, as well as management level interfaces and other mechanisms to provide interoperability between the various networks. Customer expectations may comprise an assumed or expected level of service, a level of service defined in a service level agreement (SLA) and the like.

Various embodiments are directed toward defining spectral usage at a base station wherein each of the various components is adapted to the specific infrastructure necessary to support that functionality.

For example, CCE 260 provides configuration and communication services/information. Configuration information comprises information identifying a particular antenna, the function and/or configuration of the network geographic boundaries, the function and/or configuration of a region division, e.g., hexagon, octagon or any other geometric configuration and so on. Configuration information illustratively includes, but is not limited to, information identifying the environmental factors, services supported by the base station and so on. Configuration information illustratively includes information attending to the various peripheral devices within the base station, such as power supplies, antenna, I/O circuitry and so on associated with the peripheral devices forming the infrastructure.

Communication information comprises information useful in ascertaining or inferring the connections between peripheral devices and/or radiators and so on. That is, communication information is information provided by a base station from the subjective perspective of the base station. Communication information illustratively includes, but is not limited to, source device, destination device and the like.

Operating information comprises status/operating information associated with the operating state of a specific device and/or the sub-elements associated with that device. Status/operating information illustratively includes, but is not limited to, information providing operating status/alarm indicators, including information pertaining to metrics such as utilization level, component pass/fail indication, bit error rate (BER) and the like.

Management interface (MI) 270 is generally adapted for providing an interface with management system 140 or other managing entity. Generally speaking, MI 270 provides to MS 140 information such as configuration information, status/operating information and connection information. The base station obtains from MS 140 information enabling the performance of various functions, such as local configuration information, LTE network configuration or operations information due to local network adaptations, rerouting, failures, degradations, scheduled maintenance and the like.

Figure 3:
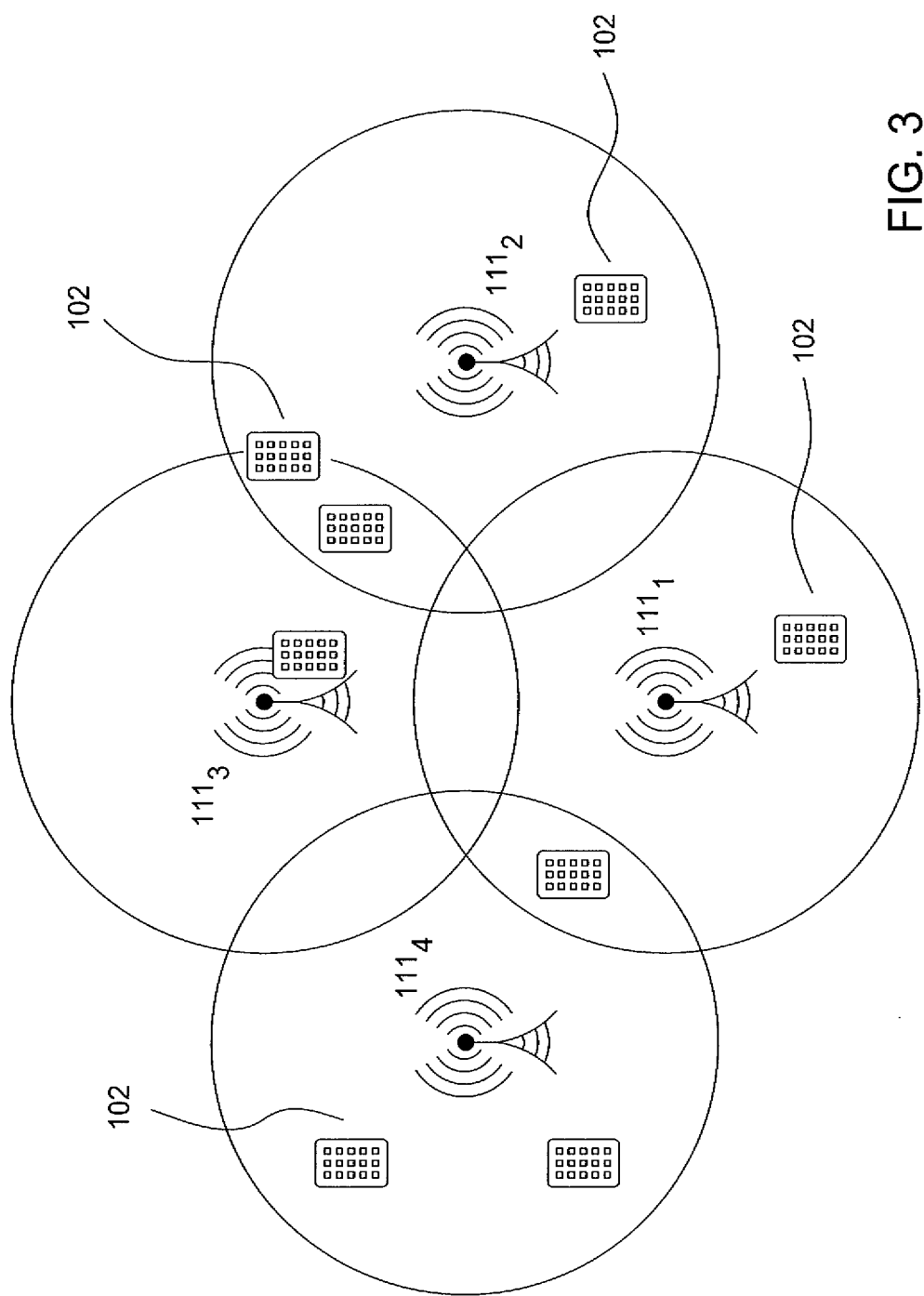
FIG. 3 depicts a graphical illustration of an exemplary LTE network supported by the system of FIG. 1.

FIG. 3 depicts a graphical illustration of an exemplary mobile network supported by the system of FIG. 1. Specifically, FIG. 3 depicts a simplified model of a portion of a mobile network, comprising several geographically distributed base stations. Specifically, FIG. 3 depicts self-configured base stations 111₁-111₄ supporting UEs 102. UEs 102 are wireless user devices capable of accessing a wireless network, such as LTE network 110. The UEs 102 are capable of supporting control signaling in support of the bearer session(s). The UEs 102 may be a phone, PDA, computer, or any other wireless user device.

In the embodiment of FIG. 3, the notion of overlapping cell-edge areas in neighboring base stations is illustrated in order to formulate the approach used by the various embodiments in the context of fractional frequency reuse.

The following two definitions will facilitate a detailed discussion of how the various methodologies, functions, programs, topologies, tools and so on enable self-configuration of fractional frequency reuse patterns at base stations. A distributed algorithm is k-local (or has a locality value of k) if each base station uses only information regarding its k-neighbors (base stations within k units of distance). An algorithm is k-cascade (or has a cascade value of k) if a dynamic change in the network (e.g., addition or deletion of a base station or changes in utility functions) only affects a limited part of the network; specifically, the k-neighbors of the event. Although primarily depicted and described herein with respect to the embodiments of FIG. 5, it will be appreciated that the algorithm described herein may be used in other wireless networks.

In one embodiment, the spectrum available for use by a base station is divided into a set of orthogonal channels K. Given a set of n base stations, a model of interference among them and the set K of available channels. One embodiment operates to efficiently find an "interference-free" channel assignment to the nodes that maximizes the "spectrum utilization" while satisfying the rest of the objectives. This may be done in a distributed fashion with bounded local and cascading values. A maximized spectrum utility reflects assigning channels to the base stations which will make the best use of them. The utility functions can simply be non-increasing functions showing the "incremental" utility of each base stations if more channels were assigned to it, i.e., for a base station i, $w_i(k)$ is i's utility for getting its kth channel (assuming i has already been assigned k−1 channels).

In one embodiment, a base station always has positive incremental utility for each additional channel although after obtaining a large number of channels, these increments may be minimal.

In one embodiment, a flexible distributed algorithm provides relatively optimal spectrum utilization and imposes tight bounds on local and cascading values. This algorithm may be built on top of another static algorithm based on hexagonal division technique.

In one embodiment, a centralized version of the distributed algorithm is used.

Hexagonal Division Embodiment

As previously noted, various embodiments operate to provide a flexible tool that can be tuned to achieve some of the objectives (fully of partially) without sacrificing the others. Several pairwise interference embodiments are considered starting with the Unit Disk Graph (UDG) model, wherein the coverage region of each base station is assumed to be a disk of uniform radius.

In one embodiment, a "centralized static" version of the algorithm for the UDG model is discussed. In another embodiment, a distributed and dynamic approach is described.

In some embodiments, the techniques are applied to more general pairwise interference models. In other embodiments, the more complicated physical interference model is described.

A. Pairwise Interference Embodiments. A formal definition of the model and the problem addressed are presented. The mobile network model consists of a set of geographically distributed base stations as depicted in the embodiment of FIG. 3. The available spectrum is divided into orthogonal channels which are assigned to base stations based on their utility of such channels. Each base station is associated with a region around it called its cell; each base station serves its clients in its cell. The cell is divided into two regions, inner and edge regions as depicted in FIG. 4.

Figure 4:
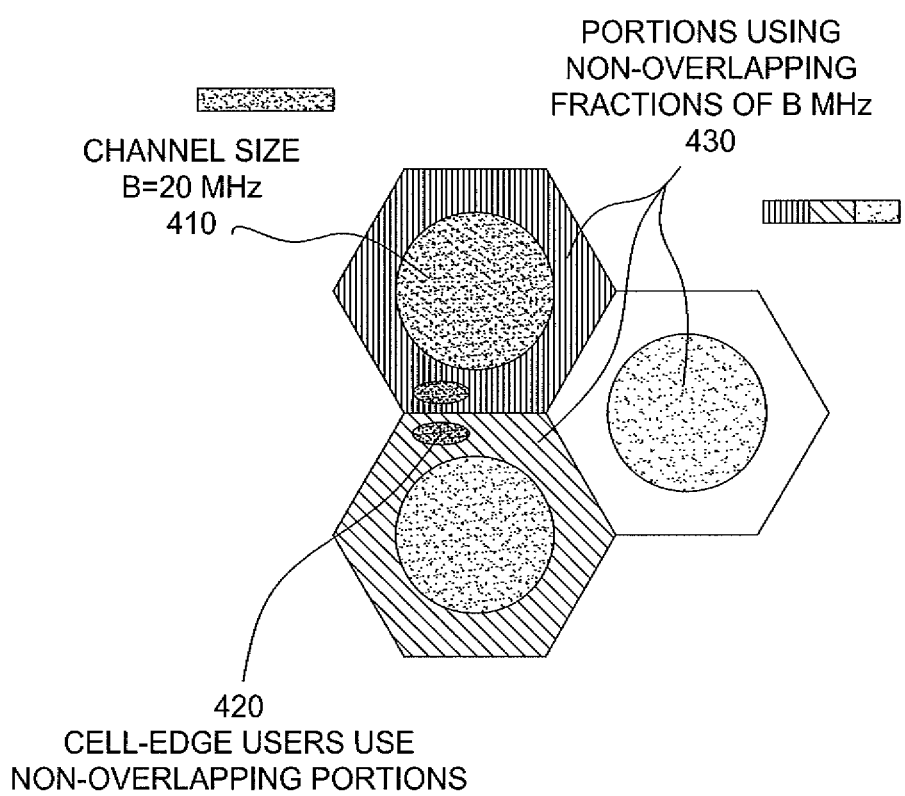
FIGS. 4-4A depict graphical illustration of fractional frequency reuse in LTE networks and interaction of base stations in adjacent interfering regions.

FIG. 4 depicts a graphical illustration of fractional frequency reuse in LTE networks and interaction of base stations in adjacent interfering regions. Specifically, the cell comprises inner region 410 and outer regions 420, 430.

Although primarily depicted and described with respect to inner region 410 and outer regions 430, it will be appreciated that the cell may be divided in any other suitable division for providing the wireless services associated with the base station.

In one embodiment, the base station uses any channel to serve its clients in the inner region 410 without worrying about the wireless interference generated by multiple near-by base stations operating on the same channel. In the edge region 420-430, on the other hand, this interference might disrupt the communication between the base station and its clients. Ideally, the base station and the client should operate "interference-free" on the same channel, but in case this is not possible, interference must be minimized.

In the pairwise interference embodiment, pairs of base stations with intersecting cells are said to interfere with each other if operating on the same channel. These pairs of interfering base stations can be represented by simple edges over base stations as vertices in an interference graph.

In one embodiment, the interference graph $G_t=(N_t, E_t)$ is an undirected graph where each vertex represents a base station and there is an edge $(i, j) \in E_t$ between i and j if the corresponding base stations "interfere". As mentioned before, two base stations are said to interfere when their corresponding cells intersect. Note that allocating a common channel to interfering base stations should be avoided. The utility functions captures the importance of obtaining new channels by each base station. For a base station i, $W_i(k)$ represent the utility of obtaining the $k^{th}$ channel (assuming i has already been assigned k−1 channels).

To overcome the difficulty of estimating the utility function, one embodiment uses a fixed set of utility functions and each base station is allowed to choose the function that fits its traffic load.

The algorithm herein described takes into consideration a given interference graph, a set of channels, and the utility functions and minimum channel demands of each base station to find an interference-free assignment of contiguous sets of channels to base stations with maximum total utility in a distributed manner, where the minimum channel demands of each base station is satisfied.

In some embodiments, where there are dynamic changes to the network, such as base station addition, deletion and traffic load changes (leading to changes in utility functions), the effect of these changes are limited to the local neighborhood of the change location.

As previously indicated, several pairwise interference embodiments are considered starting with the Unit Disk Graph (UDG) model, wherein the coverage region of each base station is assumed to be a disk of uniform radius. In the unit disk graph (UDG) embodiment, the coverage region of each base station is assumed to be a disk of uniform radius d. In the interest of simplicity, distances are to be normalized, i.e., d=1. Thus, two base stations interfere if they are within two-unit distance from each other.

Figure 4A:
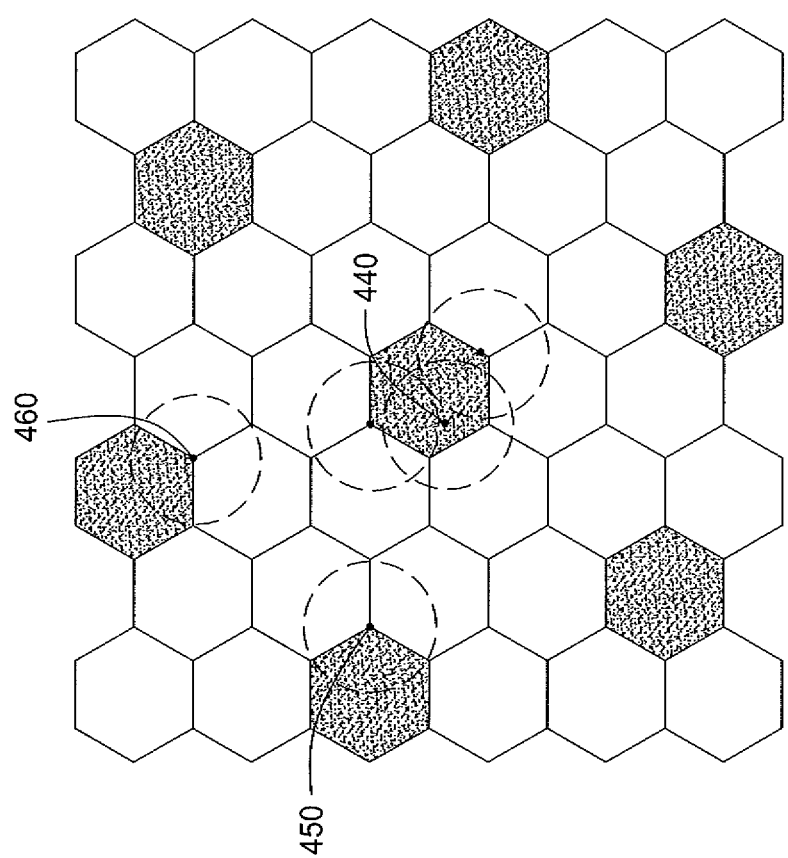
Figure 6:
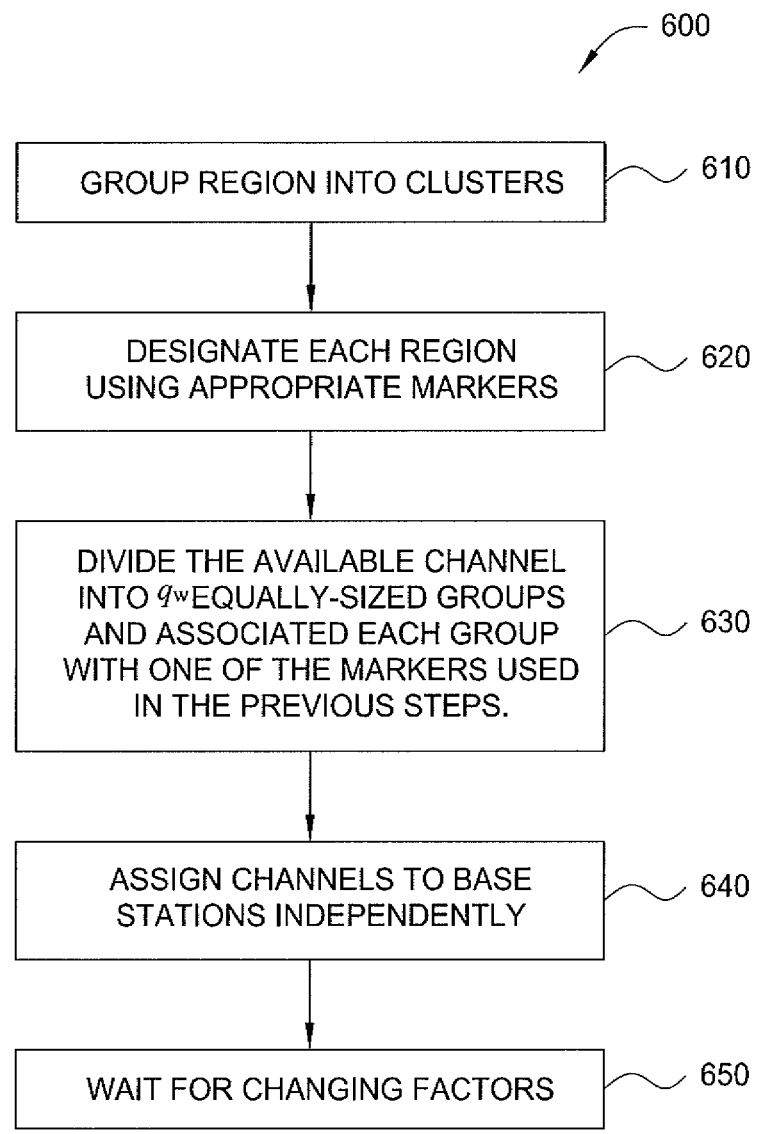
FIG. 6, depicts one embodiment of a method for performing a spectral allocation function using the clustering approach.

At a high level, the hexagonal division algorithm comprises the following steps: 1) divide the entire network region into small hexagons of side-length one unit each as depicted in FIG. 4A; (this division ensures that any pair of base stations in the same hexagon interfere with each other (due to the unit-disk interference model); 2) designate the hexagons in a linear fashion with a marker, such that base stations in hexagons with the identical marker are more than two-unit distance away and hence do not interfere; for example, in one embodiment, markers 1 to 7 are used and in other embodiments other markers are used; 3) divide the available channels into 7 equally-sized groups and associate each group with one of the markers used in the previous step; 4) assign channels to base stations in each hexagon independently using only the group of channels associated with the color of the hexagon. Note that the interference subgraph in each hexagon is actually a complete graph.

The algorithm in one embodiment starts by diving the plane into hexagons of side-length one unit each (creating a hexagonal division of the plane), and proceed to uniformly designate these hexagons using 7 markers. In such a scheme, the following two properties hold: (P1) every pair of base stations in the same hexagon interfere with each other (i.e., are connected by an edge in the interference graph). (P2) Base stations in different hexagons with same marker do not interfere with each other (i.e., are not connected by an edge in the interference graph). Property (P1) follows directly from the definition of unit disk interference, while property (P2) follows from the fact that the distance between base stations in different hexagons with the same marker will be at least ($\sqrt{3(7)}-2)>2.$)

In order to effect the above steps, several pairwise interference embodiments are considered starting with the Unit Disk Graph (UDG) model, wherein the coverage region of each base station is assumed to be a disk of uniform radius.

The next embodiment to be discussed is the Disk Graph (DG) Embodiment wherein cells of the base stations are disks of possibly different radii. As before, two base stations are considered to interfere if their cells intersect. Let the maximum and the minimum disk radii in the network be dmax and dmin respectively. In the interest of simplicity, the distances are normalized, i.e., dmin=1. For the above disk embodiment, the base stations are divided into classes depending upon their cell's radius. The available channels are divided into equally-sized groups and each group is associated with one of the non-empty classes. Then, channel assignment for each class is performed independently. The algorithm consists of the following steps: 1) classify the base stations into $\lfloor \log(d_{max}) \rfloor$ radius classes based on their cell's radius. In particular, class L contains base stations whose cell's radius $d_i$ lie in the range $d_i \in [2^L, 2^{L+1})$; 2) divide the available channels into equally-sized groups and associate each group with one of the non-empty classes of the previous step. The number of groups should be equal to the number of non-empty radius-classes; 3) For each radius-class L: a) divide the network region into hexagons of sidelength. $2^L$ each; b) uniformly designate the hexagons using 12 markers; c) divide the channels associated with radius-class L into 12 equally sized groups and associate each group with one of the markers used in the previous step; d) independently, for each hexagon H, assign channels to base stations of radius-class L contained in H using only the group of channels associated with the marker of H. The interference sub graph induced by these base stations is a complete graph, and thus, the same technique for the unit-disk model applies.

In one embodiment, the Pseudo Disk Graph (PDG) approach is discussed. In this embodiment, cells of the base stations have irregular shapes. In one embodiment, the cells are contained within a disk of radius $d_1$ located within a larger disk of radius $d_2$ such that $d_2 \leq d_1$. In one embodiment $d_1$ and $d_2$ are the same for all base stations. In another embodiment, $d_1$ and/or $d_2$ may be different for different base stations. Also, in the interest of simplicity let $d_2=1$. The assignment algorithm for the pseudo-disk model is similar to the one for the UDG model, except that the side length of the hexagons and the marking scheme are different. To ensure the correctness of the UDG approach in the context of pseudo-disk model and to establish similar approximation bounds, the division of the regions and the marking scheme are executed in a manner to ensure that properties (P1) and (P2) discussed above hold. As for maintaining property (P1), the network region is divided into hexagons of side-length one unit, as in the case of unit-disk model. Next, the number of markers required to uniformly designate the hexagons is computed in order to satisfy property (P2). As for maintaining property (P2), i.e., to ensure that base stations in different hexagons with the same marker do not interfere, the hexagons are designated in a way such that the distance between any two points in different hexagons of the same marker is greater than $2d_1$. To estimate the number of makers required, the following two lemmas are used. Lemma 1: In a hexagonal division with side-length s and uniformly marked with x colors, the distance between the centers of two hexagons of the same maker is at least $\sqrt{3xs}$. Lemma 2: A hexagonal division can be uniformly designated using c markers if and only if c is of the form $i^2 j^2+ij$ for some positive integers i and j. I.e., $c \in S$ where $S=\{s|s=i^2+j^2++ij$ where $i, j \in \mathbb{Z}^+\}$. Now, by Lemma 1 above, to ensure a distance of $2d_1$ between co-marked hexagons, the number of markers must be at least $4d_1^2/3$. Then, by Lemma 2 above, the minimum number of markers required would be given by: $q_\omega = \min\{x|x \geq 4d_1^2/3 \text{ and } x \in S\}$.

B. Physical Interference Embodiment (Model). In the physical interference embodiment, each base station is understood as operating using the same transmission power. A reception at a certain distance from a base station is successful, if the SINR at the receiver is greater than a threshold $\beta$. More formally, a reception from a base station i is successful at a point p if and only if $$\frac{P/d(p,i)^\alpha}{N+\sum_{j \in v'} P/d(p,j)^\alpha} \geq \beta_1.$$

where V' is the set of other base stations operating on the same channel as i, d(p, x) is the distance of the point p from a base station x, N is the background noise, and $\alpha$ is the path loss exponent based on the terrain propagation model. Here, in one embodiment each node i has a "guaranteed" coverage region (a disk of radius r centered at i) within which the SINR from i to be at least as large as $\beta$. Further, in this embodiment all nodes transmit using the same power level on the assigned channels. In other embodiments, different nodes have different transmission powers.

FIG. 5 depicts an embodiment of a method for performing a spectral allocation function. Specifically, FIG. 5 depicts a flow diagram of a method 500 adapted for use in defining spectral usage at a base station.

At step 505, the method retrieves or obtains for regions forming the network. Referring to box 507, the geographic boundaries may be obtained from the network managing system (NMS), a local service or some other source. Moreover, the geographic boundaries may be hexagonal shape, orthogonal shape or other shape.

At step 510, the method retrieves or obtains from the network management system (NMS) the respective region division, e.g., hexagon, octagon or some irregular shape. As previously articulated, the channels cannot be reused inside the same, but can be fully reused across different regions of the same marker; thus, simplifying the process of channel assignment. A simple greedy algorithm that assigns each available channel to the base station with the highest utility for that channel may be used.

At step 515, the method retrieves or obtains interference factors, e.g., region deletion, region addition, base station addition, base station deletion, signal strength changes, environmental condition changes and the like. Referring to box 517, the geographic boundaries may be obtained from the network managing system (NMS), a local service or some other source.

At step 520, controller 210 determines the interference model to be used, such as geometric, actual interference, etc.

At step 525, the method determines the spectral allocation associated with the region including the base station. In various embodiments, a base station is initially assigned a minimum channel demand, with the remaining channels allocated using, e.g., a greedy utility technique. In various embodiments, any resulting non-contiguous assignment can be manipulated (through a simple swapping procedure) to convert it into a contiguous one since each channel can be assigned to exactly one base station. The greedy algorithm can be thought of as running in simulation just to figure out the number of channels to be assigned to each base station and another algorithm can simply do the actual assignment by sequentially going through all base stations assigning each one a number of contiguous channels equal to the one computed by the greedy part.

At step 530, the method optimally determines whether or not the spectrum is underutilized. If yes, then at step 535 an optimization technique is executed.

At step 540, the method selects for use an initial portion of channels within the determined spectral allocation with minimum demand level.

At step 545, the method determines whether or not the region includes another base station. If no, then at step 548 the remaining channels are allocated to the base station and at step 550 the method waits for changing factors from the network management system or other appropriate interrupts.

At step 555, the remaining channels are allocated to the base stations according to the greedy algorithm, utility function, etc.

At step 560, the method determines whether or not the spectrum is underutilized. If yes, then at step 565 an optimization technique is executed.

Although primarily depicted and described herein with respect to the "centralized static" embodiments in which the UDG model is emphasized, it will be appreciated that the algorithm may be used in other embodiments including but not limited to the distributed dynamic embodiment.

As previously indicated, a distributed algorithm is k-local (or has a locality value of k) if each base station uses only information regarding its k-neighbors (base stations within k units of distance). An algorithm is k-cascade (or has a cascade value of k) if a dynamic change in the network (e.g., addition or deletion of a base station or changes in utility functions)

only affects a limited part of the network, specifically the k-neighbors of the event. The distributed version of this algorithm is rather simple since each node knows its location and can run the hexagonal division and designation parts independently. The greedy channel assignment algorithm discussed in the above paragraph can be either handled by a central node in each hexagon, or each node can run the same algorithm and get the same result independently (provided that each run of the algorithm consider the nodes in the same order, say based on their unique IDs or locations). Here, only information of the 2-neighborhood is needed to figure out the channel distribution. Thus, this is a 2-local algorithm. The dynamic version of this algorithm is also simple. When a node i is added or deleted or when Wi changes then, only the nodes inside the same hexagon as i are affected. Thus, this is a 2-cascade algorithm.

Clustering Embodiment

As previously noted, various embodiments operate to provide a flexible tool that can be tuned to achieve some of the objectives (fully or partially) without sacrificing the others. This embodiment improves upon the hexagon division embodiment. Specifically, this embodiment is adapted to be more flexible towards the designer requirements (thus, allowing the designer to tune the trade-off properties as discussed in the introduction). This embodiment contemplates scenarios where the static hexagonal division algorithms underutilize the spectrum. For example, in the UDG embodiment, there may be occasions when one hexagon is heavily congested while a neighboring hexagon is empty. As a result, (1/7)th of the available spectrum is wasted.

In the clustering embodiment, the approach is to handle clusters of hexagons rather than single hexagons. In one embodiment, a cluster of 7 hexagons is considered. For example, using a cluster size C and an appropriate number of markers qw, the algorithm includes the following steps, namely 1) divide the network region into hexagons of side-length one unit each; 2) group the hexagons into clusters of C hexagons; 3) uniformly designate the hexagons using qw markers; and 4) divide the available channels into qw equally sized groups and associate each group with one of the markers used in the previous step; and 5) assign channels to base stations in each hexagon independently using only the group of channels associated with the marker of the hexagon. To ensure that base stations in different clusters with the same color do not interfere, the clusters are designated in a way such that the distance between any two points in different clusters of the same marker is greater than $2d_1$. This is achieved using $$qw = \min\{x | x \geq (d+2\sqrt{H(C)})^2/3C, x \in S\} \text{ markers} \quad \text{Equation (1)}$$

where:

$$H(x) = \min\{y | y \geq x \text{ and } y = 3i^2 - 3i + 1 \text{ where } i \in \mathbb{Z}^+\}$$

In one embodiment, the hexagons are grouped into uniform clusters by starting with an origin (or central) hexagon, then central hexagons of the 6 neighboring clusters are found. The hexagons are subsequently distributed among the 7 clusters. The resulting clustering is uniform in the sense that the distance between the centers of neighboring clusters is uniform, where the center of a cluster is actually the center of its central hexagon.

Although depicted and described with respect to an embodiment in grouping the hexagons into uniform clusters, it will be appreciated by those skilled in the art that the process of grouping the hexagons could be performed in any other way to yield the same result.

Physical Interference Embodiment (Model). In the physical interference embodiment, each base station is understood as operating using the same transmission power. In one embodiment, for a cluster of size $C \geq 7$, the number of markers has to be at least:

$$q_H = \min\{x | x \geq q'_H, x \geq 7, \text{ and } x \in s\}, \text{ where} \quad \text{Equation (2)}$$

$$q'_H = \frac{7}{c(\sqrt[\alpha]{\beta+1})^2}\left[6\beta c\left(\frac{4}{\alpha-2}\left(\frac{1}{\sqrt{7}(9\sqrt{7}-2\sqrt{19})-3}\right)^\alpha + \left(\frac{6}{3\sqrt{21}-2\sqrt{19}}\right)^\alpha\right)\right]^{\frac{2}{\alpha}}$$

$$q_3 = \min\left\{x \mid x \geq q'_{\frac{1}{3}}, x \geq 3, \text{ and } x \in S\right\}$$

In another embodiment, where smaller cluster sizes are considered, more optimization is needed since the centers of such clusters are chosen differently. For example, for C=3, the number of markers has to be at least:

$$q'_{\frac{1}{3}} = \frac{3}{(\sqrt[\alpha]{\beta+1})^2}\left[18\beta\left(\frac{2^{2-\alpha}}{\alpha-2} + \left(\frac{2}{3\sqrt{3}-5}\right)^\alpha\right)\right]^{\frac{2}{\alpha}} \quad \text{Equation (3)}$$

while for C=4, the number of markers has to be at least:

$$q_4 = \min\{x | x \geq q'_4, x \geq 4, \text{ and } x \in S\} \quad \text{Equation (4)}$$

where $$q'_4 = \frac{4}{(\sqrt[\alpha]{\beta}+1)^2}\left[24\beta\left(\frac{4}{3^\alpha(\alpha-2)} + \left(\frac{1}{2\sqrt{3}-3}\right)^\alpha\right)\right]^{\frac{2}{\alpha}}$$

and using C=1 means using the basic hexagonal division technique of the hexagonal division embodiment. That is, the available spectrum is divided into orthogonal channels which are assigned to base stations based on their utility of such channels. Each base station is associated with a region around it called its cell; each base station serves its clients in its cell. The cell is divided into two regions, inner and edge regions as depicted in FIG. 4.

The clustering embodiment requires finding the chromatic number of a given cluster, which in turn uses the notion of independence. A set of nodes, V*, is considered independent if for every node $u \in V^*$, the SINR value at any point in the coverage region of u is at least as large as $\beta$ even if all nodes are concurrently transmitting on the same channel. This condition may be evaluated at each node $u \in V^*$ would be to take the maximum level of interference caused by any other node $v \in V^*$, $v \neq u$ at any point in the coverage region of u. This means that if the following equation is satisfied for every $u \in V^*$, then the set V* is independent.

$$\frac{\frac{P}{r^\alpha}}{\sum_{v \in V^*, v \neq u} \frac{P}{(d(u,v)-r)^\alpha}} \geq \beta, \quad \text{Equation (5)}$$

where P is the power and d(u,v) is the distance between nodes u and v. In one embodiment, the point $p_u=(x_{p_u},y_{p_u})$ is used inside the coverage region of u where the interference from other nodes is maximized. The x-y coordinates of this point yields the solution to the following non-linear program.

$$\text{Min} \frac{((x_{p_u} - x_u)^2 + (y_{p_u} - y_u)^2)^{-\alpha/2}}{\sum_{v \in V^*, v \neq u} ((x_{p_u} - x_v)^2 + (y_{p_u} - y_v)^2)^{-\alpha/2}} \quad \text{Equation (6)}$$

$$\text{s.t. } (x_{p_u} - x_u)^2 + (y_{p_u} - y_u)^2 \leq r^2,$$

where the pair $(x_u, y_u)$ denotes the x-y coordinates of node u.

Although depicted and described with respect to an embodiment in determining the independence of a set of nodes, it will be appreciated by those skilled in the art that additional conditions may yield a higher degree of accuracy in determining the independence of a set of nodes.

A computer suitable for use in performing the functions described herein may include, illustratively, a processor element (e.g., a central processing unit (CPU) and/or other suitable processor(s)), a memory (e.g., random access memory (RAM), read only memory (ROM), and the like), a management module/processor, and various input/output devices (e.g., a user input device (such as a keyboard, a keypad, a mouse, and the like), a user output device (such as a display, a speaker, and the like), an input port, an output port, a receiver/transmitter (e.g., network connection or other suitable type of receiver/transmitter), and storage devices (e.g., a hard disk drive, a compact disk drive, an optical disk drive, and the like)). In one embodiment, computer software code associated with methods for invoking the various embodiments can be loaded into the memory and executed by processor to implement the functions as discussed herein above. The computer software code associated with methods for invoking the various embodiments can be stored on a computer readable storage medium, e.g., RAM memory, magnetic or optical drive or diskette, and the like.

It should be noted that functions depicted and described herein may be implemented in software and/or in a combination of software and hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, and/or stored within a memory within a computing device operating according to the instructions.

Although primarily depicted and described herein with respect to embodiments in which the operational capability is used for ensuring self configuration of fractional frequency reuse patterns in 4G LTE networks, it will be appreciated that the configuration capability may be used for other types of wireless networks, including, but not limited to, other types of 4G wireless networks, 3G wireless networks, 2.5G wireless networks, 2G wireless networks, and the like, as well as combinations thereof.

Various embodiments operate to enable self-configuration of fractional frequency reuse (FFR) patterns for LTE/WiMAX. For example, various methodologies, functions, programs, topologies, tools and so on described herein with respect to long term evolution (LTE) self-configuration (typically accessed via eNodeBs) may be utilized within other types of wireless networks.

Various embodiments operate to enable a base station to self-configure by providing a workable solution to the often-conflicting objectives of:

1) Computational efficiency: the self-assignment procedure should be efficient and use only local neighborhood information for computation;

2) Controlled cascading and stability: in the event of cell addition or deletion, the impact of recomputing the FFR should be restricted to a well-defined local neighborhood of the base station and should not cascade over the entire network;

3) Optimality of solution: the spectrum utilization resulting from FFR computed should be closest to optimal as possible. Practical considerations requires that the following additional objectives must be met:

1) Contiguity: each base station is assigned a contiguous chunk of the spectrum.

2) Minimum Demand Satisfaction: each base station is assigned a minimal part of the spectrum necessary to carry out its basic functionality. Unfortunately, satisfying all of the above objectives/properties at the same time is hard. In fact, a subset of them can be proven to be NP-complete even under simplistic assumptions. Another difficulty comes from the fact that some of these objectives conflict with each other and satisfying one comes at the expense of the other.

Although various embodiments which incorporate the teachings of the present invention have been shown and described in detail herein, those skilled in the art can readily devise many other varied embodiments that still incorporate these teachings.

What is claimed is:

1. A method for defining spectral usage at a base station in a wireless network, the wireless network being divided into a plurality of regions, wherein each of the regions may have associated with it one or more interfering adjacent regions, wherein interfering adjacent regions are associated with different portions of a spectral allocation, said method comprising:

determining, at said base station, the spectral allocation associated with the region including said base station;

selecting for use an initial portion of a plurality of channels within the determined spectral allocation sufficient to meet a minimum demand level;

obtaining one or more interference factors associated with the region; and determining a respective interference model associated with the corresponding region in response to the obtaining step.

2. The method of claim 1, further comprising:

in response to a determination that the region including said base station includes another base station, selecting for use an allocation of a remaining portion of said plurality of channels within the determined spectral allocation.

3. The method of claim 2, wherein said allocation of said remaining portion of said plurality of channels is selected using a utility function.

4. The method of claim 1, further comprising:

adapting said selection of channels in response to change in interference associated with interfering adjacent region.

5. The method of claim 1, wherein each of said regions comprises a hexagon having a side-length of one unit and is deemed to be an interfering adjacent region to any other region within a two unit distance.

6. The method of claim 5, wherein said interference relationships between base stations comprise pairwise interference (PW) model and physical interference (PH) model.

7. The method of claim 1, wherein each portion of said spectral allocation comprises 1/Nth of said spectral allocation, where N is selected to provide a number of spectral allocation portions sufficient to associate interfering adjacent regions with different spectral allocation portions.

8. The method of claim 1, wherein said interference changes comprise one or more of a region deletion, a region addition, a base station deletion, a base station addition, signal strength changes, or environmental condition changes.

9. A non-transitory computer readable medium for storing computer instructions which, when processed by a computer, adapt the operation of the computer to perform a method for defining spectral usage at a base station in a wireless network, the wireless network being divided into a plurality of regions, wherein each of the regions may have associated with it one or more interfering adjacent regions, wherein interfering adjacent regions are associated with different portions of a spectral allocation, said method comprising:
    determining, at said base station, the spectral allocation associated with the region including said base station;
    selecting for use an initial portion of a plurality of channels within the determined spectral allocation sufficient to meet a minimum demand level;
    obtaining one or more interference factors associated with the region; and
    determining a respective interference model associated with the corresponding region in response to the obtaining step.

10. The non-transitory computer readable medium of claim 9, further comprising:
    in response to a determination that the region including said base station includes another base station, selecting for use an allocation of a remaining portion of said plurality of channels within the determine spectral allocation.

11. The non-transitory computer readable medium of claim 9, wherein said initial portion of said plurality of channels is selected to meet a minimum demand level, and said allocation of said remaining portion of said plurality of channels is selected using a utility function.

12. The non-transitory computer readable medium of claim 9, wherein each of said regions comprises a hexagon having a side-length of one unit and is deemed to be an interfering adjacent region to any other region within a two unit distance.

13. The non-transitory computer readable medium of claim 12, wherein said interference relationships between base stations comprise pairwise interference (PW) model and physical interference (PH) model.

14. The non-transitory computer readable medium of claim 9, wherein each portion of said spectral allocation comprises 1/Nth of said spectral allocation, where N is selected to provide a number of spectral allocation portions sufficient to associate interfering adjacent regions with different spectral allocation portions.

15. The non-transitory computer readable medium of claim 9, wherein said interference changes comprise one or more of a base station deletion, a base station addition, signal strength changes, or environmental condition changes.

16. A computer system for defining spectral usage at a base station in a wireless network, the wireless network being divided into a plurality of regions, wherein each of the regions may have associated with it one or more interfering adjacent regions, wherein interfering adjacent regions are associated with different portions of a spectral allocation, said computer system comprising:
    a controller adapted to:
    (a) determine the spectral allocation associated with the region including said base station;
    (b) select for use an initial portion of a plurality of channels within the determined spectral allocation sufficient to meet a minimum demand level;
    (c) obtain one or more interference factors associated with the region; and
    (d) determine a respective interference model associated with the corresponding region in response to (c).

17. The computer system of claim 16, further comprising:
    in response to a determination that the region including said base station includes another base station, selecting for use an allocation of a remaining portion of said plurality of channels within the determine spectral allocation.

18. The computer system of claim 16, wherein said initial portion of said plurality of channels is selected to meet a minimum demand level, and said allocation of said remaining portion of said plurality of channels is selected using a utility function.

19. The computer system of claim 16, wherein each of said regions comprises a hexagon having a side-length of one unit and is deemed to be an interfering adjacent region to any other region within a two unit distance.

20. The computer system of claim 19, wherein interference relationships between base stations comprise pairwise interference (PW) model and physical interference (PH) model.

21. The computer system of claim 16, wherein each portion of said spectral allocation comprises 1/Nth of said spectral allocation, where N is selected to provide a number of spectral allocation portions sufficient to associate interfering adjacent regions with different spectral allocation portions.

22. The computer system of claim 16, wherein interference changes comprise one or more of a base station deletion, a base station addition, signal strength changes, or environmental condition changes.

* * * * *